United States Patent [19]
Yoerkie, Jr. et al.

[11] Patent Number: 5,310,137
[45] Date of Patent: May 10, 1994

[54] HELICOPTER ACTIVE NOISE CONTROL SYSTEM

[75] Inventors: Charles A. Yoerkie, Jr., Newington; William A. Welsh, North Haven; Thomas W. Sheehy, Hamden, all of Conn.

[73] Assignee: United Technologies Corporation, Stratford, Conn.

[21] Appl. No.: 870,434

[22] Filed: Apr. 16, 1992

[51] Int. Cl.⁵ .............................................. B64C 27/00
[52] U.S. Cl. .................... 244/17.27; 244/1 N; 244/17.11; 188/379; 74/606 R; 74/572; 74/574
[58] Field of Search ............... 244/17.27, 1 N, 17.11; 188/378, 379, 380; 74/606 R, 572, 574; 248/554-559

[56] References Cited

U.S. PATENT DOCUMENTS

| | | | |
|---|---|---|---|
| 2,361,071 | 10/1944 | Vang | 188/1 |
| 3,566,993 | 3/1971 | Leatherwood et al. | 188/1 |
| 4,362,281 | 12/1982 | Cresap et al. | 244/17.27 |
| 4,562,589 | 12/1985 | Warnaka et al. | 381/71 |
| 4,566,118 | 1/1986 | Chaplin et al. | 381/71 |
| 4,600,863 | 7/1986 | Chaplin et al. | 318/114 |
| 4,715,559 | 12/1987 | Fuller | 244/1 N |
| 4,720,060 | 1/1988 | Yana | 188/329 |
| 4,735,296 | 4/1988 | Pinson | 188/379 |
| 4,795,123 | 1/1989 | Forward et al. | 248/550 |
| 4,819,182 | 4/1989 | King et al. | 364/508 |
| 4,869,474 | 9/1989 | Best et al. | 267/136 |
| 4,974,794 | 12/1990 | Aubry et al. | 244/17.27 |
| 5,154,371 | 10/1992 | Grant et al. | 244/17.27 |
| 5,190,244 | 3/1993 | Yana | 188/379 |

*Primary Examiner*—Margaret A. Focarino
*Assistant Examiner*—Christopher P. Ellis
*Attorney, Agent, or Firm*—Terrance J. Radke

[57] ABSTRACT

An active noise control (ANC) system for a helicopter that is operative to effectively nullify one or more high frequency vibrations emanating from the main transmission gearbox thereof at the gearbox/airframe interface, thereby significantly reducing the interior noise levels of the helicopter, that is design optimized to minimize the number of actuators required, and that is design optimized to minimize contamination forces arising from operation of the system actuators. The ANC system includes modified transmission beams that are mechanically stiffened to function as rigid bodies with respect to the one or more of the high frequency vibrations, a plurality of actuators disposed in combination with the modified transmission beams, a plurality of sensors disposed in combination with the modified transmission beams in a collinear, spaced apart functional correlation with respective actuators, and controllers interconnecting individual actuators with respective functionally correlated sensors.

15 Claims, 5 Drawing Sheets

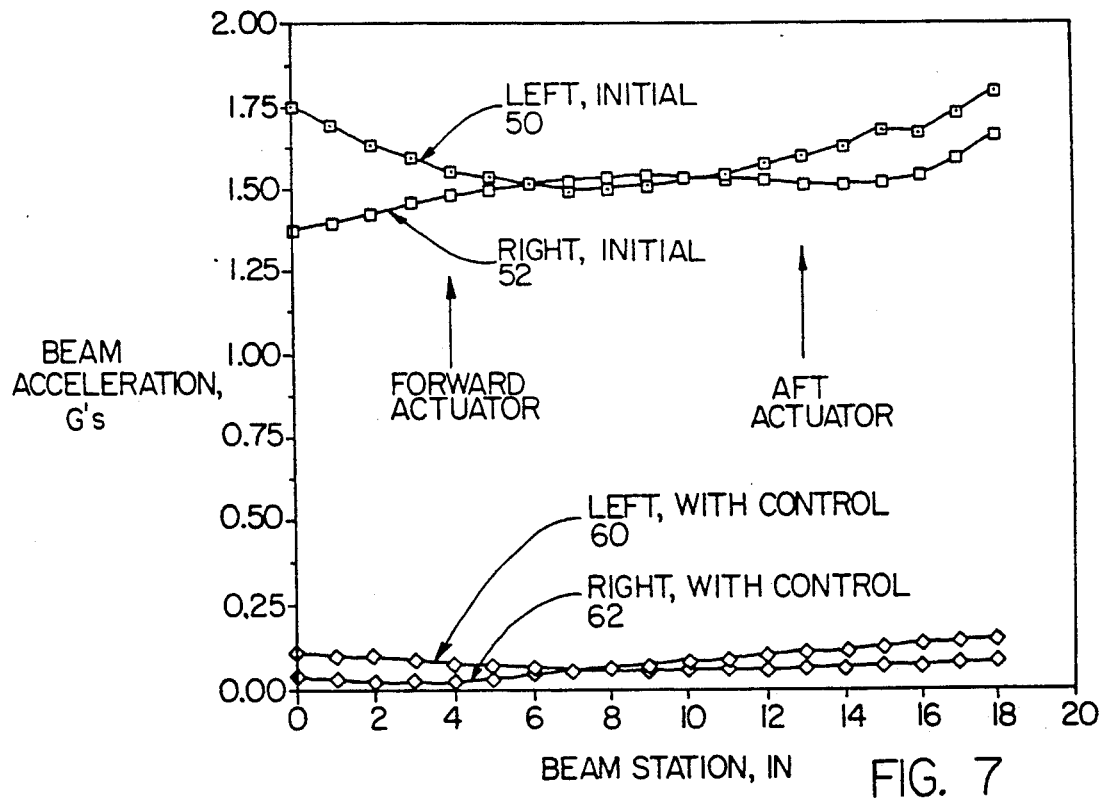

HELICOPTER ACTIVE NOISE CONTROL SYSTEM

RELATED APPLICATION

The present application is related to commonly-owned, co-pending patent applications entitled HELICOPTER NOISE REDUCTION THROUGH GEARING MODIFICATIONS (S-4591), filed Mar. 9, 1992, and SYSTEM AND METHOD FOR TRANSMISSION GEARBOX NOISE CONTROL UTILIZING LOCALIZED OIL COOLING/HEATING (S-4463), filed Mar. 9, 1992.

FIELD OF THE INVENTION

The present invention is directed to systems for reducing helicopter interior noise levels resulting from airframe vibrations, and more particularly, to an active noise control (ANC) system that is operative, utilizing optimally combined sensors and force actuators mounted on interface structural members that are mechanically stiffened in their entirety or only at specific localized segments, to nullify high frequency vibrations emanating from the helicopter main transmission gearbox at the gearbox/airframe interface, thereby providing a significant reduction in interior noise levels. The ANC system of the present invention has particular utility in abating high frequency vibrations emanating from the main transmission gearbox of S-76 ® helicopters (S-76 is s registered trademark of the Sikorsky Aircraft Division of United Technologies Corporation).

BACKGROUND OF THE INVENTION

Interior noise control is a primary concern in the operation of helicopters. While there are numerous sources of noise-generating vibrations occurring in an operating helicopter, such as the main rotor assembly, the main transmission, the engines, the tail rotor assembly, the hydraulic system, aerodynamic forces, etc., the vibrations emanating from the main rotor assembly and the main transmission have the most pronounced effect on helicopter interior noise levels, i.e., in the cockpit and/or cabin.

The operation of the main rotor assembly during forward flight of the helicopter results in the generation of "low frequency" vibrations at the blade passing frequency (and harmonics thereof). The blade passing frequency is equal to the product of the number of main rotor blades and the rotational speed of the rotor. For example, the main rotor assembly of the BLACK HAWK ® helicopter (BLACK HAWK is a registered trademark of Sikorsky Aircraft), which has four main rotor blades, has a blade passing frequency of approximately 17 Hz. Similarly, the S-76 ® helicopter has a blade passing frequency of approximately 19 Hz.

The operation of the main transmission of the helicopter, in contrast, results in the generation of "high frequency" vibrations. For example, Sikorsky helicopters of the S-76 ® series, e.g., S-76A, S-76B, S-76C, have a main transmission that includes three stages of reduction gearing: a first stage for each engine output consisting of helical gearing, an intermediate stage consisting of spiral bevel gearing, and a final reduction stage comprising a central bull gear that intermeshes with right and left hand bull pinions (to combine the inputs of the two engines that provide the motive power for S-76 ® helicopters). Research has shown that the cockpit and/or cabin noise levels of S-76 ® helicopters are primarily the result of vibrations originating in the main transmission.

Narrow band Fast Fourier Transform analyses, A-weighted octave levels, and overall dBA levels recorded in the cockpits and/or cabins of S-76A, S-76B, and S-76C helicopters indicate that interior noise levels are predominantly the result of vibrations occurring at the bull gearing meshing frequency of 778 Hz, as illustrated in FIG. 1. The vibrations produced by the first and second reduction stages of S-76 ® main transmission gearboxes, i.e., noise levels generated by the helical and spiral gearing as illustrated in FIG. 1, occur at higher frequencies and typically are not significant relative to the dominant noise levels produced by the fundamental and first few harmonics of the bull gearing meshing vibrations.

The high and low frequency vibrations emanating from the main transmission and the main rotor assembly, respectively, are coupled into the helicopter airframe via a main transmission gearbox support truss or the main transmission gearbox (the feet thereof being mechanically secured to structural members comprising the airframe). The high and low frequency vibratory forces coupled into the airframe structure induce vibratory responses of many airframe natural modes. The natural modes of the airframe can excite natural modes of the cockpit and/or cabin acoustic volume. It is the response of the acoustic modes that produces the undesirable noise levels within the helicopter cockpit and/or cabin.

Such noise levels generally cannot be effectively abated by parasitic type acoustic treatment of the cockpit and/or cabin interior. Acoustic panels or blankets may be partially effective for very high frequency induced noise, but are not very effective vis-a-vis induced noise in the 300 to 1000 HZ range and don't work at all with respect to low frequency induced noise emanating from the main rotor assembly. The weight penalty incurred by the use of acoustic panels or blankets, moreover, negatively impacts the performance capability of the helicopter.

Another passive technique involves the use of vibration isolators at the interface between the main rotor assembly/transmission gearbox and the airframe structure. Such vibration isolators transmit only a reduced portion of the noise-generating vibrations into the helicopter airframe due to their inherent softness. These vibration isolators, however, must be interposed in the primary load path of the helicopter, and transmission deflections under steady flight loads may cause high speed engine-to-transmission drive shaft deflections that may adversely impact shaft reliability.

Active noise suppression methods are known for alleviating the noise generated by high and/or low frequency vibrations emanating from the main transmission and/or the main rotor assembly. U.S. Pat. No. 4,819,182 discloses an apparatus and method primarily for reducing induced vibrations in a helicopter fuselage due to low frequency vibrations emanating from the main rotor assembly. The embodiment, described in the '182 application, includes a raft structure, which supports the main transmission gearbox, that is attached to the helicopter fuselage by elastomeric units that provide the load path for coupling main rotor assembly loads into the fuselage. Electro-hydraulic actuators are disposed between the raft and the fuselage adjacent respective elastomeric units and are operative in response to control signals to produce reactive forces that reduce vibrational loads induced in the helicopter fuselage by the main rotor assembly. Accelerometers mounted in the helicopter cockpit and cabin measure the vibratory loads and provide control signals to control the magnitude and phase of the reactive forces provided by the actuators.

U.S. Pat. No. 4,600,863 describes an actuator for reducing the coupling of vibrations from a source to the source support structure. The actuator is operative in response to signals provided by an accelerometer to provide vibration-canceling forces along the axis of the actuator. An in-line shear isolator is provided in series with the axis of the actuator and is operative to decouple source-derived vibrations that are orthogonal to the axis of the actuator. The in-line shear isolator allows a single actuator to be utilized to reduce the effect of source-derived vibrations on the support structure.

U.S. Pat. No. 4,795,123 describes an active damping system wherein a plurality of damping elements are operative to dampen sensed vibrations in a mechanical structure over the range of 20 to 15,000 Hz at respective structure contact points. Each damping element, which includes an accelerometer, an integrator, a mixer, a power amplifier and a driver, is operative to dampen vibrations in one dimension along the axis formed by the element and its structural contact point. Damping of vibrations in three dimensions at a specified point is accomplished by attaching three damping elements at right angles to one another. One described embodiment includes an accelerometer coaxially disposed with respect to a wrap around driver while another described embodiment includes an accelerometer physically separated from the driver. One object of the vibration damping system described in the '123 patent is to dampen vibrations in mechanical structures while minimizing the impact on the design and operation thereof.

Active noise control systems that are designed to counteract low frequency vibrations emanating from the main rotor assembly, e.g., the apparatus described in the '182 patent, are generally not effective to counteract the high frequency vibrations emanating from the main transmission gearbox. And, while active damping systems such as that described in the '123 patent which are active over a wide frequency range that encompasses both the high and low frequency vibrations being coupled into the helicopter airframe may be utilized to attempt to counteract such vibrations, such a broadband system would generally not be effective in significantly reducing the high frequency vibrations emanating from the main transmission gearbox. The damping elements, being designed for broadband operation, are not functionally optimized for operation at one or more of the predetermined frequencies defining the high frequency vibrations emanating from the main transmission gearbox. The number of active damping systems of the type described in the '123 patent may be excessive since the number of systems must be equal to the number of natural vibrational modes of the helicopter airframe that contribute to excessive interior noise levels.

A need exists for an active control system that is operative to effectively cancel or nullify the high frequency vibrations emanating from the main transmission gearbox. The active noise control system should be design optimized for operation with respect to one or more of the identified high frequency vibrations emanating from the main transmission gearbox. The active noise control system should be design optimized to minimize the number of actuators required to effectively nullify the one or more identified high frequency vibrations emanating from the main transmission gearbox. The active noise control system should be further design optimized to eliminate induced contaminating vibrations arising from the operative interaction between the actuators and sensors of the system.

SUMMARY OF THE INVENTION

One object of the present invention is to provide an active noise control system for a helicopter that is operative to effectively nullify high frequency vibrations emanating from the main transmission gearbox thereof.

One more object of the present invention is to provide an active noise control system for a helicopter that is design optimized to effectively nullify one or more identified high frequency vibrations emanating from the main transmission gearbox.

Another object of the present invention is to provide an active noise control system that is design optimized to reduce the number of actuators required to effectively nullify high frequency vibrations emanating from the main transmission gearbox.

Still another object of the present invention is to provide an active noise control system that is design optimized to substantially reduce or eliminate induced contaminating vibrations caused by the operation of the system actuators.

Yet another object of the present invention is to provide an active noise control system having interface structural members at the main transmission gearbox/airframe interface that are designed and configured to function as rigid bodies at one or more of the high frequency vibrations to be nullified.

A further object of the present invention is to provide an active noise control system wherein the interface structural members are rigidized by mechanically stiffening each interface structural member in its entirety, or alternatively, mechanically stiffening only a specific localized segment of each interface structural member adjacent each hardpoint thereof, with respect to one or more of the high frequency vibrations to be nullified.

These and other objects are provided by an active noise control (ANC) system according to the present invention that comprises modified transmission beams, a plurality of counterforce generating actuators, a corresponding plurality of sensors, and a corresponding plurality of single channel controllers. The ANC system according to the present invention is operative to effectively cancel or nullify high frequency vibrations emanating from the main transmission of a helicopter at the transmission gearbox/airframe interface, thereby providing a marked decrease in the interior noise levels of the helicopter. The ANC system has been design optimized to minimize the number of actuators required to effectively nullify high frequency vibrations emanating from the main transmission. The ANC system has been further design optimized to minimize induced vibrations, i.e., "contamination", arising from operation of the system actuators.

The sources primarily responsible for the interior noise levels of certain helicopters have been identified. In particular, specific high frequency vibrations emanating from the main transmission gearbox have been identified as the most significant source of such interior noise levels. A substantial majority of these high frequency vibrations are the result of the gearing interactions in the various gearing reduction stages of the helicopter main transmission. Further, the primary frequencies and harmonics thereof of the specific high frequency vibrations emanating from the main transmission gearbox as well as the amplitudes thereof have been identified.

The main transmission gearbox is generally secured directly in combination with the helicopter airframe through transmission beams, i.e., the transmission beams function as the interface structural members between the transmission gearbox and the helicopter airframe. Such a transmission gearbox functions as part of the load path for the dynamic longitudinal, lateral, vertical, and torsional low frequency vibratory loads developed during operation of the main rotor assembly of the helicopter. These low frequency vibratory loads are coupled from the gearbox into the transmission beams and the helicopter airframe.

The high frequency vibrations emanating from the main transmission gearbox due to gearing interactions (as well as operation of the hydraulic pump) are coupled through the gearbox into the transmission beams and the helicopter airframe. Such high frequency vibrations may excite diverse natural vibrational modes of the airframe. Excited natural vibrational modes of the airframe, in turn, can excite natural modes of the acoustic volume of the helicopter interior. It is the excitation of these acoustic modes that produces the undesirable noise levels within the helicopter cockpit and/or cabin.

The approach of the ANC system of the present invention involves the nullification of such high frequency vibrations at the main transmission gearbox/airframe interface, i.e., at the mounting points of the transmission gearbox to the respective transmission beams. Nullification of the high frequency vibrations at this interface substantially precludes induced excitation of natural vibrational modes of the helicopter airframe. This, in turn, substantially eliminates the excitation of the natural modes of the acoustic volume of the helicopter interior, and in consequence, results in a significant abatement of undesirable noise levels throughout the helicopter interior.

The ANC system according to the present invention includes modified transmission beams that function as interface structural members. The modified transmission beams are designed and configured to function as a rigid body at one or more of the high frequencies of interest, i.e., the high frequency vibrations emanating from the main transmission gearbox. The modified transmission beams are designed and configured for mechanical "stiffness" at such frequencies.

Two different design approaches may be utilized to mechanically stiffen transmission beams to provide modified transmission beams for the ANC system of the present invention.

In the first design approach, each transmission beam of the interface structural configuration is mechanically stiffened in its entirety with respect to one or more of the high frequency vibrations of interest. In the second design approach, only a specific localized segment adjacent each hardpoint of each transmission beam of the interface structural configuration is mechanically stiffened with respect to one or more of the high frequency vibrations of interest.

Under the first design approach, as a result of the "entire rigid body" characteristics of the modified transmission beams, i.e., each modified transmission beam has only six degrees of freedom with respect to one or more of the high frequency vibrations of interest, each such modified transmission beam of the ANC system requires at most only six independent actuators mounted in combination therewith to effectively nullify the high frequency vibrations of interest emanating from the main transmission gearbox. Under the second design approach, due to the "localized rigid body" characteristics of the modified transmission beams, i.e., each localized mechanically stiff segment of such transmission beams has six degrees of freedom with respect to one or more of the high frequency vibrations of interest, each such modified transmission beam requires at most six actuators for each hardpoint (localized mechanically stiffened segment) thereof to effectively nullify the high frequency vibrations of interest emanating from the main transmission gearbox.

Each modified transmission beam includes one or more hardpoints for mounting the transmission gearbox in combination therewith. The plurality of actuators and the corresponding plurality of sensors are also mounted in combination with the modified transmission beams. Each actuator is mounted directly to a mounting fixture, which in turn, is mounted directly to the corresponding modified transmission beam. Conventional actuators of the type known in the art may be utilized in the present invention. Each actuator of the ANC system is operative, in response to command signals from a corresponding single channel controller, to generate a single dimensional counterforce having a frequency, magnitude, and phase to effectively nullify the respective dimensional component of the high frequency vibrations of interest emanating from the main transmission gearbox.

Each actuator of the ANC system has associated therewith a single sensor that is mounted in a collinear, spaced apart correlated relation with respect thereto to eliminate induced "contaminating" vibrations that could arise from the operation of the corresponding actuator. The individual sensors may be mounted in combination with the corresponding mounting fixture or may be directly mounted to the corresponding modified transmission beam. Each sensor is operative to detect a single dimensional component (frequency/magnitude) of the one or more high frequency vibrations of interest and to generate a signal representative thereof.

Each actuator and its functionally correlated sensor are operatively interconnected by means of a single channel controller. The controller is operative, in response to detected signals generated by corresponding sensor, to generate a command signal that is transmitted to the corresponding actuator to control the operation thereof. The command signal causes the respective actuator to generate a counterforce having a frequency and magnitude equal to the specific dimensional component of the one or more high frequency vibrations of interest, but opposite in phase thereto. The command signal further causes the respective actuator to generate a canceling force that counteracts contaminating forces at the source of the respective contaminating force.

BRIEF DESCRIPTION OF THE DRAWINGS

A more complete understanding of the present invention and the attendant features and advantages thereof may be had by reference to the following detailed description when considered in conjunction with the accompanying drawings wherein:

FIG. 7 is a graph illustrating the achievable reduction in high frequency vibration levels provided by the ANC system of the present invention.

DETAILED DESCRIPTION OF PREFERRED EMBODIMENTS

Figure 1:
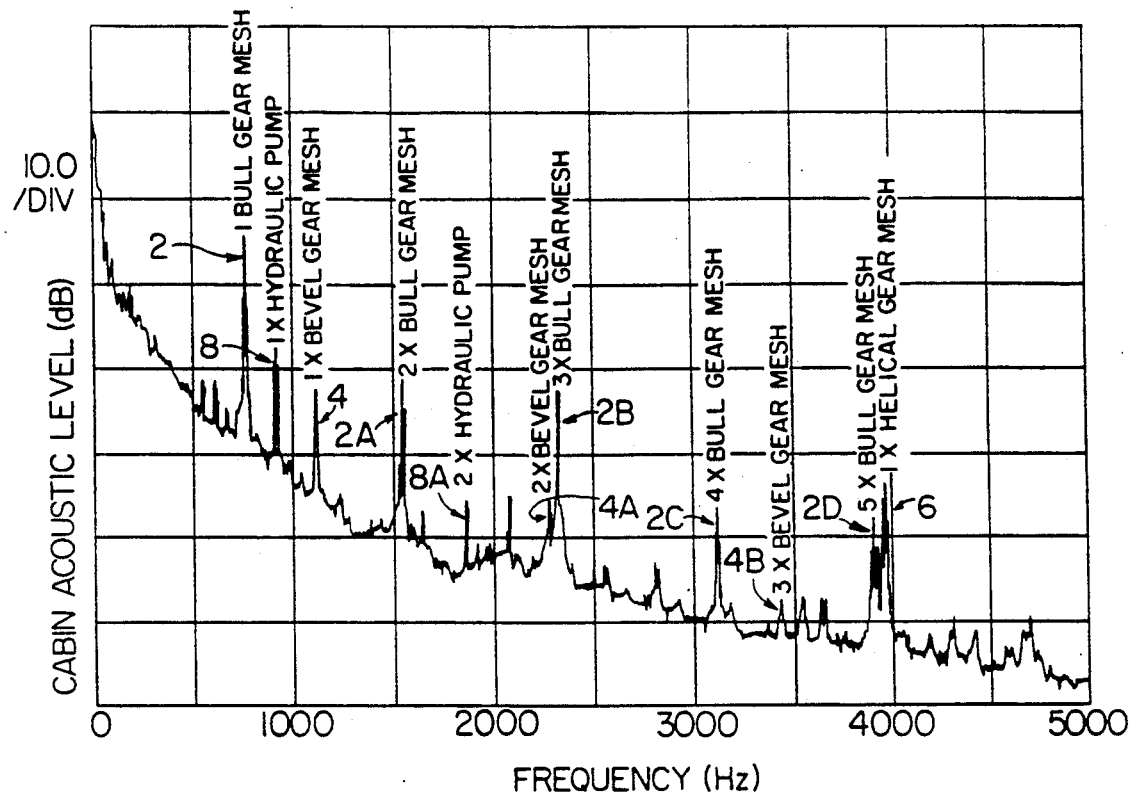
FIG. 1 is a graph illustrating the frequency spectra of the high frequency vibrations emanating from an S-76® main transmission gearbox.

Referring now to the drawings wherein like reference numerals identify corresponding or similar elements throughout the several views, one embodiment of an active noise control (ANC) system 10 according to the present invention is exemplarily illustrated in FIGS. 4, 5, 5A, and 5B. The ANC system 10 of the present invention comprises modified transmission beams 12, a plurality of force generating actuators 20, a corresponding plurality of sensors 30, and a corresponding plurality of single channel controllers 40.

The ANC system 10 according to the present invention is operative to effectively cancel or nullify high frequency vibrations emanating from the main transmission of a helicopter at the transmission gearbox/airframe interface, thereby providing a marked decrease in the interior noise levels of the helicopter. The ANC system 10 of the present invention has been design optimized to minimize the number of actuators 20 required to effectively nullify high frequency vibrations emanating from the main transmission gearbox. The ANC system 10 of the present invention has been further design optimized to minimize "contamination" arising from operation of the system actuators 20, i.e., undesired forces and noises generated by the operation of the individual actuators 20 at frequencies different than the high frequency vibrations emanating from the main transmission gearbox.

The ANC system 10 according to the present invention is described in further detail in the following paragraphs in terms of various structural and/or functional features of an S-76® helicopter. Research conducted by Sikorsky Aircraft has identified the sources primarily responsible for the high frequency interior noise levels of the S-76® helicopter. In particular, such research has identified specific high frequency vibrations emanating from the main transmission gearbox as the most significant source (greater than 90%) of such interior noise levels. A substantial majority of these high frequency vibrations are the result of the gearing interactions in the various gearing reduction stages (the S-76® has three reduction stages: the helical gearing, the bevel gearing, and the bull gearing) of the S-76® main transmission.

Further, such research has identified the primary frequencies and harmonics thereof of the specific high frequency vibrations emanating from the S-76® main transmission gearbox (see FIG. 1). This research is described in further detail in commonly-owned, co-pending patent applications entitled HELICOPTER NOISE REDUCTION THROUGH GEARING MODIFICATIONS (S-4591), filed Mar. 9, 1992, and SYSTEM AND METHOD FOR TRANSMISSION GEARBOX NOISE CONTROL UTILIZING LOCALIZED OIL COOLING/HEATING (S-4463), filed Mar. 9, 1992, which are incorporated herein by reference. Thus, while the structural and functional features of the ANC system 10 of the present invention are described hereinbelow in terms of specifics of the S-76® helicopter, it is to be understood that the ANC system 10 of the present invention has utility for reducing interior noise levels in other types of helicopters by counteracting or nullifying high frequency vibrations emanating from the helicopter main transmission. High frequency as used in the present context refers to frequencies >700 Hz while low frequency refers generally to frequencies <700 Hz, but most often to frequencies <100 Hz, e.g., the primary blade passing frequencies of main rotor assemblies.

Figure 2:
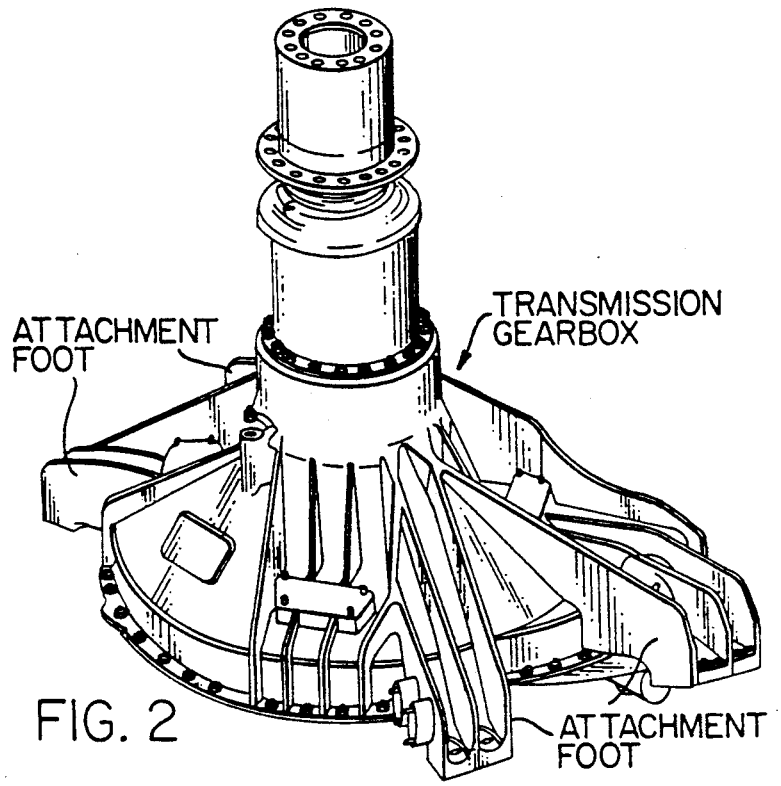
FIG. 2 is an external perspective view of an S-76® main transmission gearbox.

The S-76® main transmission gearbox illustrated in FIG. 2 is secured in combination with the helicopter airframe through two transmission beams, i.e., the transmission beams function as the interface structural members between the transmission gearbox and the helicopter airframe. The four attachment feet of the gearbox are bolted to four corresponding hardpoints of the transmission beams (two per beam). The transmission gearbox of the S-76® helicopter functions as part of the load path for the dynamic longitudinal, lateral, vertical, and torsional low frequency vibratory loads developed during operation of the main rotor assembly. These low frequency vibratory loads are coupled from the gearbox, via the attachment feet, into the transmission beams and the helicopter airframe.

It is a standard design practice at the present time to fabricate each interface structural member to function as a rigid body (a rigid body is defined as a structural member that has six degrees of freedom: three translational, three rotational) at the low frequencies of the dynamic loads developed by the main rotor assembly. Interface structural members having such low frequency rigidity are operative to couple the main rotor assembly low frequency vibratory loads uniformly throughout the helicopter airframe, i.e., uniform load distribution. Thus, conventional helicopter interface structural members may be configured as very deep (vertical dimension) and narrow (lateral dimension) I-beams inasmuch as lateral loading is low such that beam stiffness in the lateral dimension is not required. This standard design practice provides interface structural members of relatively low weight, which correlates with low weight solutions that are a primary driving factor in helicopter design.

In a similar manner, the high frequency vibrations emanating from the main transmission gearbox due to gearing interactions (as well as operation of the hydraulic pump) are coupled through the gearbox, via the attachment feet, into the transmission beams and the helicopter airframe. Since conventional transmission beams do not function as rigid bodies at these high frequencies, such high frequency vibrations may excite diverse natural vibrational modes of the airframe. Excited natural vibrational modes of the airframe, in turn, can excite natural modes of the acoustic volume of the helicopter interior. It is the excitation of these acoustic modes that produces the undesirable noise levels within the helicopter cockpit and/or cabin.

One approach to abating the undesirable interior noise levels caused by the high frequency vibrations emanating from the main transmission gearbox is described in commonly-owned, co-pending patent applications entitled HELICOPTER NOISE REDUCTION THROUGH GEARING MODIFICATIONS (S-4591), filed Mar. 9, 1992, and SYSTEM AND METHOD FOR TRANSMISSION GEARBOX NOISE CONTROL UTILIZING LOCALIZED OIL COOLING/HEATING (S-4463), filed Mar. 9, 1992. This approach goes directly to the primary source of high frequency vibrations, i.e., the gearing interactions within the transmission gearbox. Two different solutions are described in the foregoing patent applications for reducing the high frequency vibrations generated by the gearing interactions.

The approach of the ANC system 10 of the present invention, in contrast, involves the nullification of such high frequency vibrations at the main transmission gearbox/airframe interface, i.e., at the mounting points (hardpoints) of the gearbox attachment feet to the respective transmission beams. Nullification of high frequency vibrations at this interface substantially precludes induced excitation of natural vibrational modes of the helicopter airframe. This, in turn, substantially eliminates the excitation of the natural modes of the acoustic volume of the helicopter interior, and in consequence, results in a significant abatement of undesirable noise levels throughout the helicopter interior.

An initial problem encountered by the inventors in implementing an active noise control system to effectively nullify the high frequency vibrations emanating from the main transmission gearbox was the structural and functional characteristics of conventional transmission beams. As disclosed hereinabove, conventional transmission beams are designed and fabricated to function as rigid bodies at the low frequency dynamic loads emanating from the main rotor assembly. However, for higher frequency vibrations, i.e., the high frequency vibrations emanating from the main transmission gearbox, such transmission beams no longer function as rigid bodies, but rather act as elastic bodies such that natural vibrational modes of the helicopter airframe may be excited. In other words, the number of degrees of freedom of such transmission beams exceeds the six degrees of freedom of a rigid body. This, in turn, means that a correspondingly larger number of force actuators must be utilized to effectively nullify such high frequency vibrations, i.e., to provide active noise control. The cost and weight increases associated with such a large number of actuators (and associated sensors and controllers) makes active noise control under this approach an impractical solution for nullifying such high frequency vibrations in helicopters having conventional transmission beams.

Figure 3A:
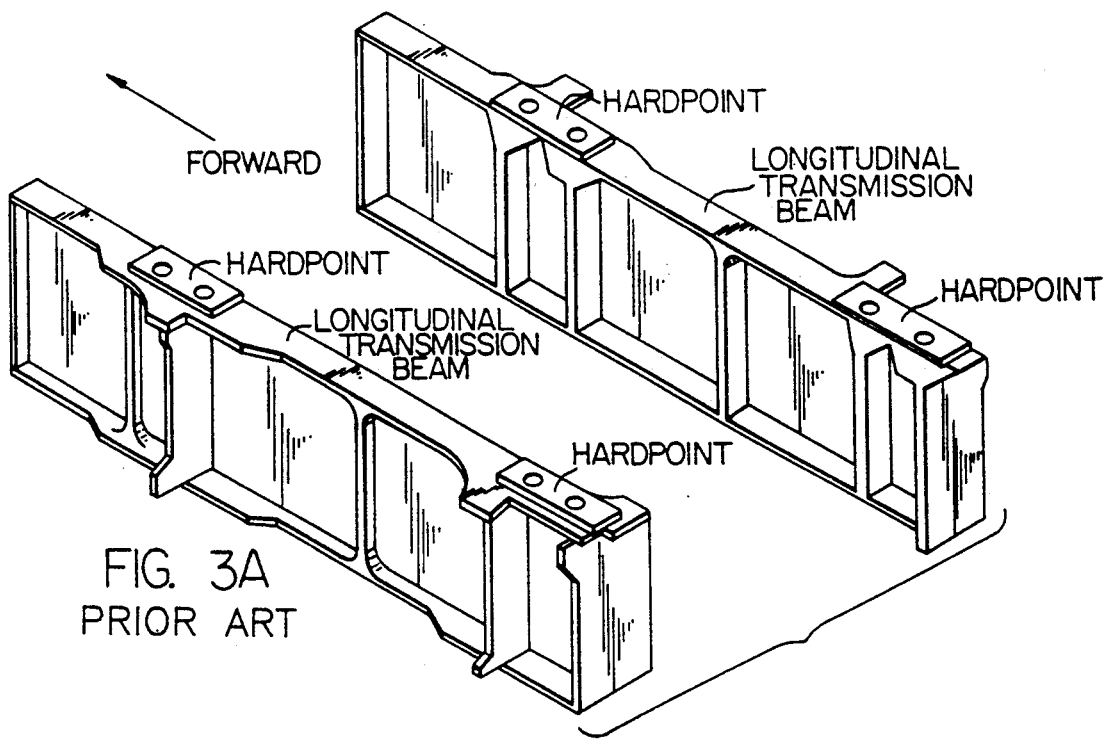
FIG. 3A is a perspective view of one interface structural configuration for mounting a main rotor assembly/transmission gearbox in combination with a helicopter airframe.

In recognition of the foregoing problem, the inventors design optimized the ANC system 10 of the present invention to minimize the number of actuators required by modifying the interface structural members between the main transmission gearbox and the helicopter airframe to function as rigid bodies at one or more of the high frequencies of the vibrations emanating from the transmission gearbox, as described hereinbelow in further detail. Present day helicopters generally utilize one of a limited number of interface structural configurations for structurally integrating the main transmission gearbox in combination with the helicopter airframe. One common interface structural configuration is schematically illustrated in FIG. 3A and includes two longitudinal transmission beams that function as the interface structural members (this is the configuration currently utilized in S-76 ® helicopters). Each longitudinal transmission beam has two spaced apart hardpoints. The four attachment feet of the main transmission gearbox are bolted to respective hardpoints of the longitudinal transmission beams to mount the gearbox in combination with the helicopter airframe.

Figure 3B:
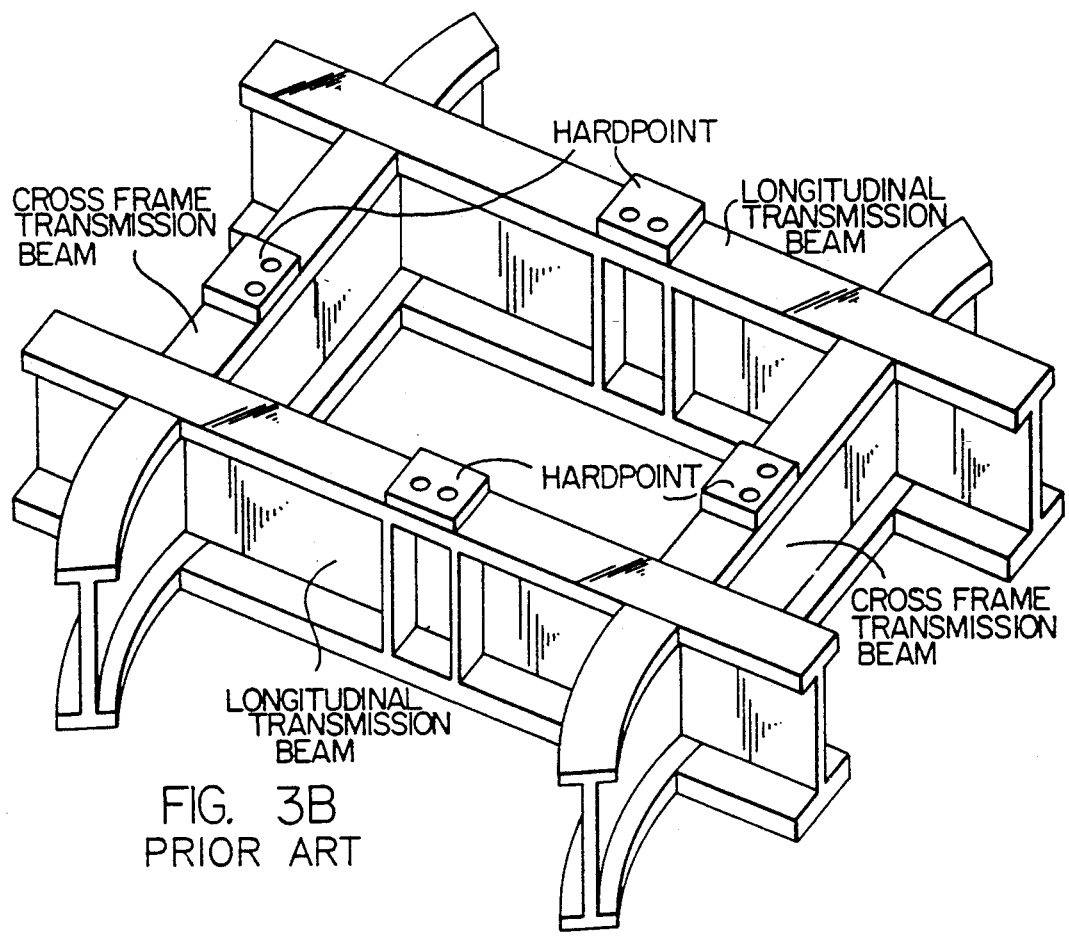
FIG. 3B is a perspective view of another interface structural configuration for mounting a main rotor assembly/transmission gearbox in combination with a helicopter airframe.

Another common interface structural configuration is schematically illustrated in FIG. 3B and includes two longitudinal transmission beams and two cross frame transmission beams that function as the interface structural members (this is the configuration currently utilized in S-70 helicopters such as the BLACK HAWK ® and SEAHAWK ® (SEAHAWK ® is a registered trademark of the Sikorsky Aircraft Division of United Technologies Corporation). Each respective transmission beam has a single hardpoint. The four attachment feet of the transmission gearbox are bolted to respective hardpoints of the longitudinal and cross frame transmission beams to mount the gearbox in combination with the helicopter airframe.

Figure 6:
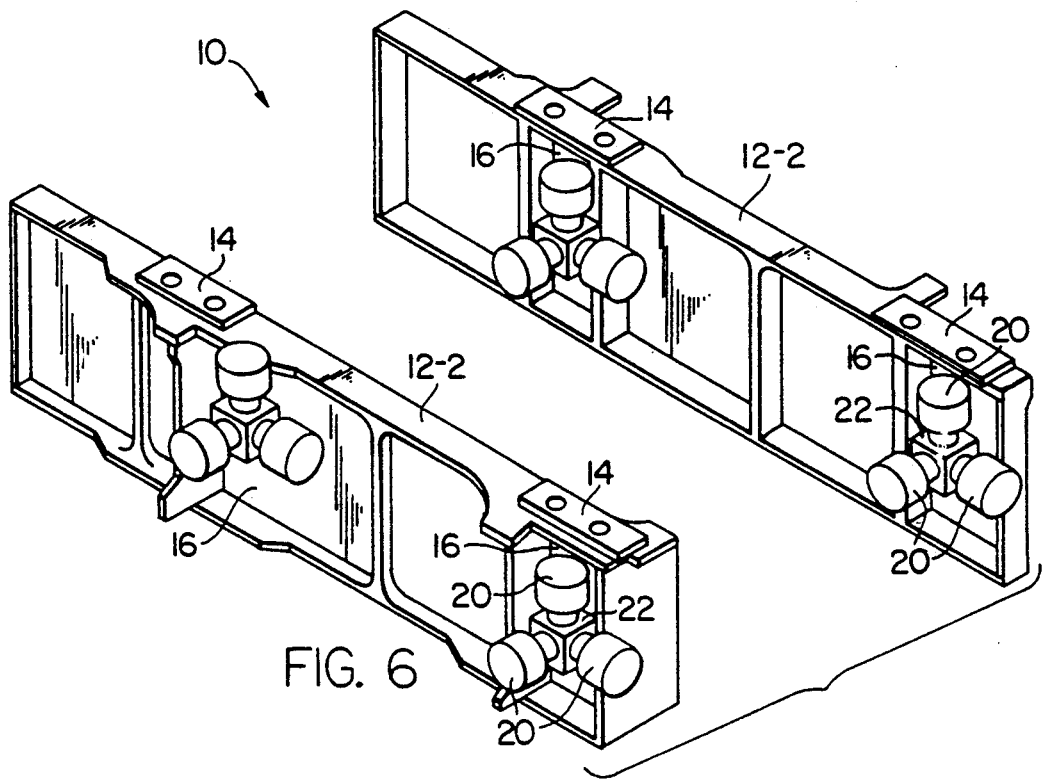
FIG. 6 is a perspective view of another embodiment of the ANC system according to the present invention for the interface structural configuration of FIG. 3A.

Two different design approaches may be utilized to provide modified transmission beams 12 for the ANC system 10 according to the present invention. Under both approaches, the structural interface members comprising the specific interface structural configuration of the helicopter are designed and configured to function as rigid bodies, i.e., to be mechanically stiff, at one or more of the high frequencies of interest, i.e., the high frequency vibrations emanating from the main transmission gearbox that are to be effectively nullified by the ANC system 10. In the first design approach, each structural interface member comprising the interface structural configuration is configured in its entirety to be mechanically stiff at one or more of the high frequencies of interest. For example, each of the longitudinal transmission beams illustrated in FIG. 3A is configured to be mechanically stiff at one or more of the high frequencies of interest to provide the modified transmission beams 12-1 illustrated in FIGS. 4 and 5. In the second design approach, only a specific localized segment adjacent the hardpoint(s) of each structural interface member comprising the interface structural configuration is configured to be mechanically stiff at one or more of the high frequencies of interest. For example, each of the longitudinal transmission beams illustrated in FIG. 3A may be configured to be mechanically stiff only adjacent each hardpoint thereof to provide modified transmission beams 12-2 having localized mechanically stiff segments 16 as illustrated in FIG. 6.

The design approach utilized depends upon a balancing among such interrelated factors as the specific structural configuration at the main transmission gearbox- /airframe interface, the specific frequencies and amplitudes of the high frequency vibrations emanating from the main transmission gearbox, the structural weight increases associated with each design approach, the number of actuators (and associated sensors and controllers) required under each design approach, and whether the ANC system of the present invention is to be retrofitted to existing helicopters or utilized in new production helicopters incorporating originally configured modified transmission beams.

For example, as described hereinabove, each modified transmission beam of the present invention is configured to function as a rigid body by mechanically stiffening either the entire structural member or a localized segment thereof adjacent each hardpoint. Mechanical stiffness as used herein defines the ability of the interface structural member to resist defined deviations, e.g., deflections, bending, moments, due to the predetermined high frequency vibrations being coupled into the interface structural members, via the attachment feet, from the main transmission gearbox. Mechanical stiffness is expressed in terms of the elastic constants and moduli of the material forming the interface structural members and is defined in part by the boundary shape and dimensions of the interface structural members. Mechanical stiffening of each interface structural member of the ANC system 10 in its entirety results in an overall weight increase in the helicopter, e.g., a pair of such modified longitudinal transmission beams weighs more than a pair of conventional longitudinal transmission beams.

Similarly, mechanical stiffening of localized segments of the interface structural members of the ANC system 10 also results in an overall weight increase in the helicopter, although not as great as that which results from mechanical stiffening of interface structural members in their entirety. As an additional consideration vis-a-vis structural weight increases, the higher the frequencies of interest, the greater the weight increase resulting from mechanical stiffening of the interface structural members with respect to the high frequencies of interest.

Counterpoised against the respective weight increases due to mechanical stiffening of the interface structural members is the number of actuators (and corresponding sensors and controllers) required under the two design approaches to mechanical stiffening. An interface structural member that is mechanically stiffened in its entirety functions as a rigid body having six degrees of freedom. As a consequence, such a modified interface structural member requires at most only six actuators to effectively nullify the high frequency vibrations of interest. A structural interface member that is mechanically stiffened only at localized segments adjacent each hardpoint, in contrast, functions as a rigid body having six degrees of freedom only with respect to each localized mechanically stiffened segment. As a consequence, each localized segment of such a modified interface structural member requires at most six actuators to effectively nullify the high frequency vibrations of interest. The implications of this facet of the present invention will be more apparent in the discussion hereinbelow of the embodiment of the ANC system 10 illustrated in FIGS. 4, 5, 5A, and 5B versus the embodiment of the ANC system 10 illustrated in FIG. 6.

Mechanical stiffening of an interface structural member for a predetermined frequency results in the interface structural member acting as a rigid body for all frequencies equal to or less than the predetermined frequency. Thus, the structural weight increases associated with the nullification of higher frequencies of interest must be balanced against the relative contributions of the various components of the high frequency vibrations emanating from the main transmission gearbox with respect to the interior noise levels of the helicopter. For example, for the S-76® main transmission gearbox, the high frequency vibrations of interest are illustrated in FIG. 1, and include the bull gearing meshing frequency 2 of about 780 Hz and the first, second, third, and fourth harmonics 2A, 2B, 2C, 2D thereof of about 1560 Hz, about 2340 Hz, about 3120 Hz, and about 3900 Hz, respectively, the bevel gearing meshing frequency 4 of about 1140 Hz and the first and second harmonics 4A, 4B thereof of about 2280 Hz and about 3420 Hz, respectively, and the helical gearing meshing frequency 6 of about 3950 Hz. Operation of the hydraulic pump generates vibrations at a frequency 8 of about 950 Hz and the first harmonic 8A thereof of about 1900 Hz. As will be appreciated by an examination of FIG. 1, the bull gearing meshing frequency 2 of about 780 Hz has the most predominant amplitude of all the high frequency vibration spectra emanating from the S-76® main transmission gearbox.

Therefore, an effective embodiment of the ANC system 10 may include modified transmission beams 12 designed and configured to function as rigid bodies at the bull gearing meshing frequency of about 780 Hz. An analysis would be performed to determine if mechanical stiffening of the modified transmission beams 12 for higher frequencies of interest, e.g., the hydraulic pump frequency 8 of about 950 Hz, the bevel gearing meshing frequency 4 of about 1140 Hz, etc., would result in a further beneficial reduction of interior noise levels in light of the weight increases due to increased mechanical stiffening of the modified transmission beams 12.

As noted hereinabove, the ANC system 10 of the present invention may be incorporated in new production helicopters or retrofitted into existing helicopters. Pragmatically, retrofitting of ANC systems 10 into existing helicopters would probably be most cost effectively accomplished by modifying the existing interface structural members to have localized segments that are mechanically stiffened with respect to one or more of the high frequencies of interest. That is, the modified transmission beams 12 would be mechanically stiffened at localized segments adjacent hardpoints rather than mechanically stiffening the transmission beams in their entirety.

The modified transmission beams 12 of the ANC system 10 according to the present invention are designed and configured to function as a rigid body as described hereinabove at one or more of the high frequencies of interest, i.e., the high frequency vibrations emanating from the main transmission gearbox that are to be effectively nullified by the ANC system 10. Once the high frequencies of interest are identified, it is within the routine capability of one skilled in the art to design and configure modified transmission beams 12 having the requisite predetermined mechanical stiffness, i.e., to function as rigid bodies as described hereinabove, at one or more of the predetermined high frequencies of interest.

The modified transmission beams 12 function as the interface structure for the ANC system 10. FIGS. 4, 5, 5A, and 5B illustrate one embodiment of the ANC system 10 for the interface structural configuration of FIG.

3A wherein the pair of longitudinal transmission beams have been mechanically stiffened in their entirety (design approach one), for one or more high frequencies of interest, to provide modified transmission beams 12-1. Each modified transmission beam 12-1 includes two spaced apart hardpoints 14. The attachment feet of the main transmission gearbox are bolted to respective hardpoints 14 to mount the gearbox in combination with the modified transmission beams 12-1. The plurality of actuators 20 and the corresponding plurality of sensors 30 are also mounted in combination with the modified transmission beams 12-1, as described hereinbelow in further detail.

As a result of the "entire rigid body" characteristics of the modified transmission beams 12-1, the inventors have determined that the embodiment of the ANC system 10 for the S-76 ® helicopter requires at most only twelve independent actuators 20 to effectively nullify the one or more predetermined high frequency vibrations of interest emanating from the main transmission gearbox (at most is used in the present context to indicate that there may be circumstances wherein one or more of the dimensional components comprising the high frequency vibrations of interest are of such low magnitude that it is not necessary to produce a nullifying counterforce therefor, i.e., an actuator may not be required for one or more degrees of freedom). Inasmuch as each modified transmission beam 12-1 functions as a rigid body with respect to the one or more predetermined high frequency vibrations of interest, each modified transmission beam 12-1 has only six degrees of freedom with respect to such high frequency vibrations. Therefore, each modified transmission beam 12-1 requires at most only six independent actuators 20 mounted in combination therewith to effectively nullify the one or more high frequency vibrations of interest being coupled thereinto from the main transmission gearbox.

In contrast, the pair of longitudinal transmission beams illustrated in FIG. 3A could also be designed and configured using design approach two as described hereinabove. For this embodiment of the ANC system 10, each longitudinal transmission beam would be mechanically stiffened at the localized segments thereof adjacent the respective hardpoints 14 for one or more predetermined high frequencies of interest to provide modified transmission beams 12-2 having localized mechanically stiff segments 16 as illustrated in FIG. 6. Due to the "localized rigid body" characteristics of such modified transmission beams 12-2, the ANC system 10 of this embodiment would require at most twenty-four actuators 20. Each localized mechanically stiff segment 16 functions as a rigid body having six degrees of freedom with respect to the one or more predetermined high frequencies of interest and therefore requires six actuators 20. Since there are four localized mechanically stiff segments 16 for the pair of modified transmission beams 12-2, twenty-four actuators at most are needed to effectively nullify the high frequency vibrations of interest emanating from the main transmission gearbox.

Figure 4:
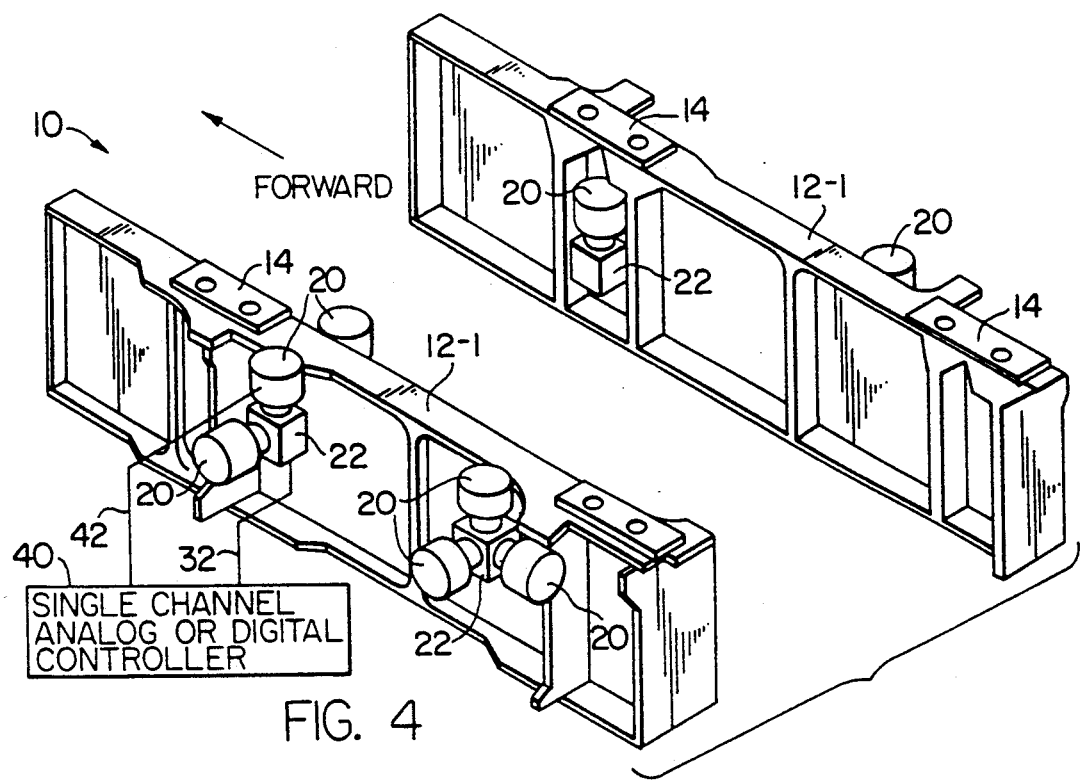
FIG. 4 is a perspective view of one embodiment of an active noise control (ANC) system according to the present invention for the interface structural configuration of FIG 3A.
Figure 5:
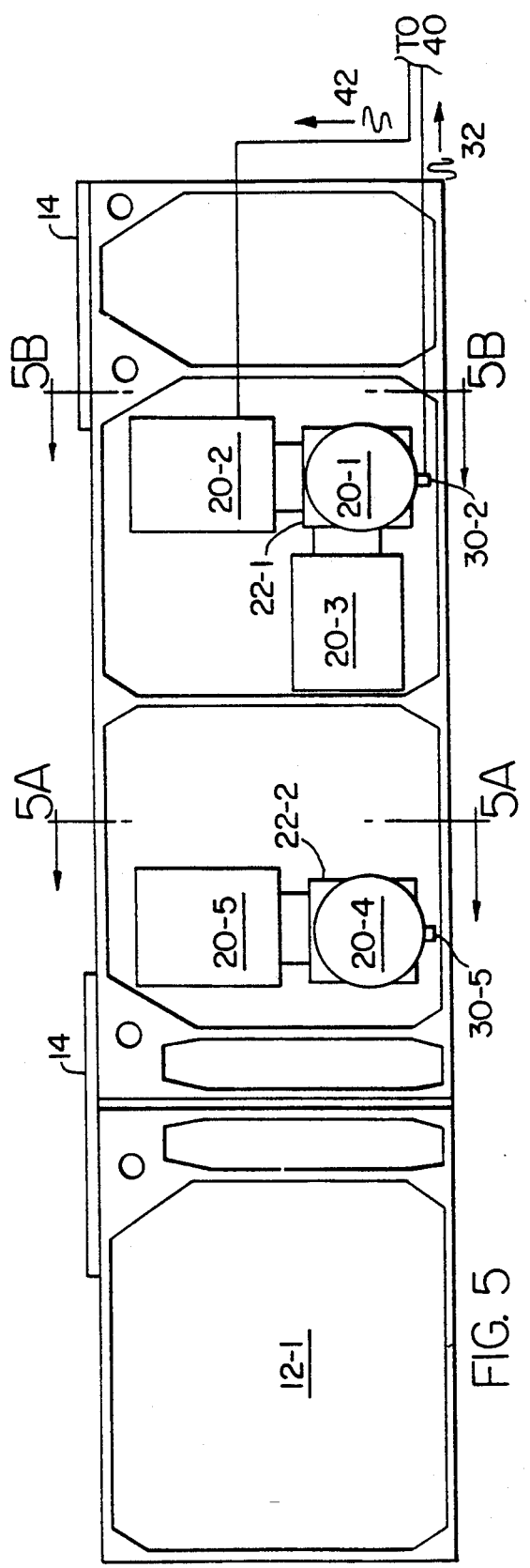
FIG. 5 is a plan view illustrating elements of the ANC system of FIG. 4.

Thus, the ANC system 10 embodiment illustrated in FIG. 6 requires twice as many actuators 20 as the ANC system 10 embodiment illustrated in FIGS. 4 and 5. However, the modified transmission beams 12-2 of the embodiment of FIG. 6 have a lower gross weight than the modified transmission beams 12-1 of the embodiment of FIGS. 4 and 5. The factors described hereinabove have to be weighed and balanced to determine which design approach is more feasible for any particular application of the ANC system 10 according to the present invention.

Six actuators 20 are mounted in combination with each modified transmission beam 12-1 for the embodiment of the ANC system 10 illustrated in FIGS. 4 and 5. Three actuators 20 are mounted adjacent the forward hardpoint 14 and three actuators 20 are mounted adjacent the aft hardpoint 14. Each actuator 20 is mounted directly to a mounting fixture 22, which in turn, is mounted directly to the corresponding modified transmission beam 12-1.

One possible arrangement for the actuators 20 of the ANC system 10 is schematically illustrated in FIG. 4. Five of the actuators 20 are mounted in combination to the outboard side of the port modified transmission beam 12-1 (the left beam of FIG. 4), three adjacent the aft hardpoint 14 by means of a first mounting fixture 22-1 and two adjacent the forward hardpoint 14 by means of a second mounting fixture 22-2. The sixth actuator 20 is mounted in combination to the inboard side of the port modified transmission beam 12-1 by means of a third mounting fixture 22-3. The mounting arrangement of the six actuators 20 for the starboard modified transmission beam 12-1 mirrors the mounting arrangement of the port modified transmission beam 12-1.

A mounting arrangement equivalent to that illustrated for the aft hardpoint 14 of the port modified transmission beam 12-1 could be utilized for the embodiment of the ANC system 10 having modified transmission beams 12-2 as illustrated in FIG. 6. For this embodiment, six actuators 20 would be mounted at each localized segment 16, three on the inboard side of each respective modified transmission beam 12-2 adjacent each hardpoint 14 and three on the outboard side of each respective transmission beam 12-2 adjacent each hardpoint 14.

Figure 5B:
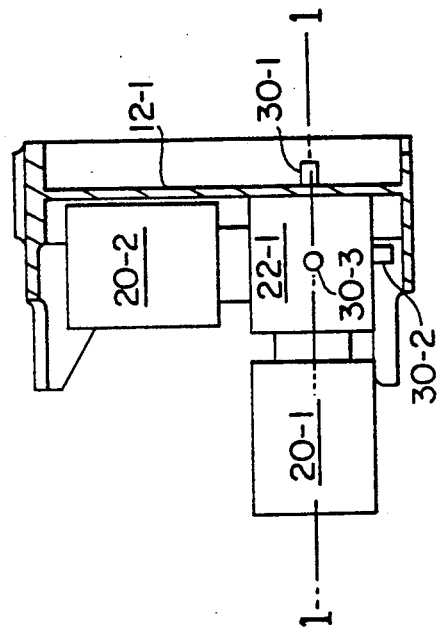
FIG. 5B is a cross-sectional view taken along line BB—BB of FIG. 5.
Figure 5A:
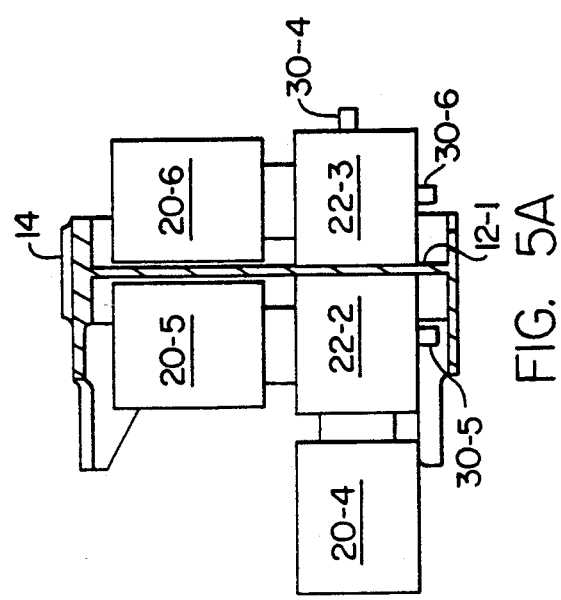
FIG. 5A is a cross-sectional view taken along line AA—AA of FIG. 5.

Conventional actuators 20 of the type known in the art may be utilized in the present invention. Each actuator 20 of the ANC system 10 is operative, in response to command signals from a corresponding single channel controller 40, to generate a single dimensional counterforce, by means of an integral inertial mass disposed internally therein, having a frequency, magnitude, and phase to effectively nullify the corresponding dimensional component of one or more of the high frequency vibrations of interest emanating from the main transmission gearbox. That is, each actuator 20 provides a counterforce having specific characteristics for one predetermined degree of freedom, i.e., in the longitudinal, lateral, or vertical dimension. The operation of respective pairs of actuators 20 in combination effectively nullifies respective rotational moments induced by the one or more high frequency vibrations of interest. For the embodiment of the ANC system 10 illustrated in FIGS. 4 and 5, the respective pairs comprise actuator combinations mounted on a single modified transmission beam 12-1. With reference to FIG. 5A, for example, actuators 20-5 and 20-6 are operative in combination to effectively nullify one rotational moment emanating from the main transmission gearbox. For the embodiment of the ANC system 10 illustrated in FIG. 6, the respective pairs comprise actuator combinations mounted at each localized mechanically stiff segment 16.

In light of the foregoing performance requirements, actuators 20 utilized in the ANC system 10 of the present invention should be lightweight (minimally sized inertial mass), and have fast response times and the capability to generate counterforces having frequencies and amplitudes (each respective controllers 40 is operative to provide command signals 42 of appropriate phase necessary to cause generation of the counterforces described hereinabove) sufficient to effectively nullify the one or more high frequency vibrations of interest. The actuators 20 may be electrically, hydraulically, or electro-hydraulically driven. The actuators 20 illustrated in the embodiments of FIGS. 4 and 6 generate counterforces by reacting against the respective integral inertial masses.

The inventors further recognized that the operation of the actuators 20 of the ANC system 10 could generate undesirable forces at frequencies different from those to be nullified, i.e., contamination. Even with the modified transmission beams 12-1 or 12-2 functioning as rigid bodies as described hereinabove, such contaminating forces could be coupled into the airframe (and subsequently cause generation of undesirable noise in the helicopter interior as described hereinabove) since the modified transmission beams 12-1 or 12-2 may not be configured to function as rigid bodies at the very high frequencies at which some of the contaminating forces occur. As a consequence, if vibration sensors are mounted non-collinearly with the functionally associated actuator 20 on a modified transmission beam 12-1 or 12-2, the contaminating forces could yield undesirable non-rigid body (elastic) deflections elsewhere on the modified transmission beam 12-1 or 12-2 which could cause generation of undesirable noise in the helicopter interior. This notwithstanding the fact that the controller would be operative to regulate operation of the associated actuator 20 to locally nullify the contamination vibration components at the specific sensor locations.

As a solution to obviating such contaminating forces, each actuator 20 of the ANC system 10 has functionally associated therewith a single vibration sensor 30. Further, each sensor 30 is mounted in a collinear, spaced apart, functional correlation with respect to the corresponding actuator 20. That is, each sensor 30 lies on the respective counterforce axis of the corresponding actuator 20, but spaced apart therefrom, i.e., collinear. With reference to FIGS. 5, 5A, 5B, each of the six actuators 20-1, 20-2, 20-3, 20-4, 20-5, 20-6 mounted on the port modified transmission beam 12-1 as described hereinabove has a corresponding sensor 30-1, 30-2, 30-3, 30-4, 30-5, 30-6, respectively, mounted in collinear, spaced apart functional correlation thereto. For example, as exemplarily illustrated in FIG. 5B, sensor 30-1, which is functionally correlated with actuator 20-1, lies on the counterforce axis 1-1 of actuator 20-1 in spaced apart relation therefrom.

The individual sensors 30 may be mounted in combination with the corresponding mounting fixture 22, or may be directly mounted to the corresponding modified transmission beam 12-1 or 12-2. For example, with reference to FIGS. 5A and 5B, sensors 30-2 and 30-3 are directly mounted to the mounting fixture 22-1, sensor 30-5 is directly mounted to the mounting fixture 22-2, and sensors 30-4 and 30-6 are directly mounted to the mounting fixture 22-3. Sensor 30-1, in contrast, is mounted directly to the inboard side of the port modified transmission beam 12-1.

Each sensor 30 is operative to detect a single dimensional component (frequency/magnitude) of the one or more high frequency vibrations of interest and to generate a signal 32 representative thereof. For example, with reference to FIG. 5B, sensor 30-1 detects those components of the one or more high frequency vibrations of interest being exerted along the counterforce axis 1-1. Sensors 30 having utility in the ANC system 10 of the present invention are conventional vibration pickups. For example, electromechanical transducers such as accelerometers that are capable of detecting the frequencies and amplitudes of the one or more high frequency vibrations of interest may be utilized in the ANC system 10 of the present invention.

Each actuator 20 and its functionally correlated sensor 30 are operatively interconnected by means of a single channel controller 40 (only one controller 40 is illustrated in the drawings (FIG. 4) to simplify the drawings for ease of understanding). The controller 40 is operative, in response to the detected signal 32, to generate a command signal 42 that is transmitted to the corresponding actuator 20 to control the operation thereof. The command signal 42 is a two component signal. The first component of the command signal 42 has a magnitude and frequency equal to the magnitude and frequency of the specific dimensional component of the one or more high frequency vibrations of interest to be nullified, but is opposite in phase. The first component of the command signal 42 causes the actuator 20 to generate a counterforce having a frequency, magnitude, and phase to effectively cancel or nullify the specific dimensional component of the one or more high frequency vibrations of interest being coupled into the modified transmission beam 12-1 or 12-2 from the transmission gearbox.

With each sensor 30 mounted in a collinear, spaced apart relation with respect to the functionally correlated actuator 20, the controller 40 is also operative to generate a second component of the command signal 42 that causes the respective actuator 20 to generate canceling forces to counteract the contaminating forces at the source of the respective contamination force. The controller 40 therefore serves the dual function of providing command signals 42 that cause operation of the respective actuator 20 to generate counterforces to effectively nullify the one or more high frequency vibrations of interest as well as canceling forces to suppress vibrations caused by the contamination forces. The first and second components as described hereinabove are superimposed in the controller 40 and appear as a combined command signal 42.

The single channel controller 40 may comprise a computer system such as a microprocessor. The microprocessor may be digital or analog. Algorithms for active noise control systems are known to those skilled in the art, and such an algorithm may be embedded or stored in the memory of each single channel controller 40 and operative to regulate the operation thereof.

FIG. 7 illustrates the achievable reductions in high frequency vibrations emanating from the main transmission gearbox by means of the ANC system 10 of the present invention. Plots 50, 52 illustrate corresponding vibrational force levels being coupled into conventional port and starboard transmission beams, respectively, due to the high frequency vibrations emanating from the main transmission gearbox. Plots 60, 62 illustrate the nullifying effect of the ANC system 10 embodiment of FIG. 4 on such vibrational force levels. It is estimated that the ANC system 10 of the present invention can operate to reduce the high frequency induced interior noise levels of a helicopter by about 90-95%, i.e., reductions in the range of about 10-20 dB are achievable.

A variety of modifications and variations of the present invention as described hereinabove are possible in light of the above teachings. For example, the ANC system of the present invention has been described hereinabove in terms of an S-76 ® transmission gearbox that functions, inter alia, as a support structure for the main rotor assembly. It will be appreciated, however, that the ANC system described hereinabove also has utility in eliminating high frequency vibrations emanating from the main transmission gearbox in helicopters wherein the main rotor assembly is integrated in combination with the airframe by means of a strut-type support structure. In a strut-type support structure, the high frequency vibrations of interest emanating from the main transmission gearbox (as well as the low frequency vibrations developed by the main rotor assembly) are coupled into the airframe via the strut-type support structure, i.e., the transmission gearbox is not part of the vibration load path. It is therefore to be understood that, within the scope of the present claims, the present invention may be practiced otherwise than as specifically described hereinabove.

What is claimed is:

1. An active noise control system for a helicopter for effectively nullifying high frequency vibrations emanating from the main transmission gearbox thereof to significantly reduce interior noise levels of the helicopter, comprising:

modified transmission beam means including mounting hardpoints for interfacing the main transmission gearbox in combination with the airframe of the helicopter, said modified transmission beam means being mechanically stiffened with respect to at least one of the high frequency vibrations emanating from the main transmission gearbox wherein said modified transmission beam means function as a rigid body with respect to said at least one high frequency vibration;

actuator means mounted in combination with said modified transmission beam means adjacent said transmission gearbox and airframe interface for generating a plurality of single dimensional counterforces having a frequency, magnitude, and phase to effectively nullify said at least one high frequency vibration at said transmission gearbox and airframe interface; and means operative with respect to said at least one high frequency vibration to detect magnitudes and frequencies of single dimensional components thereof at said transmission gearbox and airframe interface and to provide command signals to control operation of said actuator means to generate said single dimensional counterforces having said frequency, magnitude, and phase to effectively nullify said at least one high frequency vibration at said transmission gearbox and airframe interface wherein the interior noise levels of the helicopter are significantly reduced.

2. The active noise control system of claim 1 wherein said detecting and providing means further comprises:

sensor means mounted in combination with said modified transmission beam means adjacent said transmission gearbox and airframe interface for detecting the magnitudes and frequencies of the single dimensional components of said at least one high frequency vibration and for generating detection signals representative thereof, and wherein said sensor means is mounted in combination with said transmission beams in collinear, spaced apart functional correlation with said respective actuators means; and controller means functionally interconnecting said actuator means and said sensor means and operative in response to said detection signals for providing said command signals to control operation of said actuator means to generate said single dimensional counterforces having said frequency, magnitude, and phase to effectively nullify said at least one high frequency vibration at said transmission gearbox and airframe interface wherein the interior noise levels of the helicopter are significantly reduced.

3. The active noise control system of claim 2 wherein said controller means is further operative in response to said detection signals for providing said command signals to control operation of said actuator means to generate nullifying forces to counteract contaminating forces arising from operation of said actuator means.

4. The active noise control system of claim 1 wherein said modified transmission beam means are mechanically stiffened in their entirety with respect to said at least one high frequency vibration emanating from the main transmission gearbox.

5. The active noise control system of claim 1 wherein said modified transmission beam means are mechanically stiffened only at localized segments thereof adjacent each mounting hardpoint of said modified transmission beam means.

6. The active noise control system of claim 1 wherein said modified transmission beam means comprises port and starboard modified transmission beams.

7. The active noise control system of claim 6 wherein each said port and starboard modified transmission beams are mechanically stiffened in its entirety.

8. The active noise control system of claim 7 wherein said actuator means comprises a first plurality of actuators mounted in combination with said port modified transmission beam and a second plurality of actuators mounted in combination with said starboard modified transmission beam, and wherein said first plurality of actuators is equal in number to said second plurality of actuators.

9. The active noise control system of claim 8 wherein said first plurality of actuators comprises six actuators and wherein said second plurality of actuators comprises six actuators.

10. The active noise control system of claim 6 wherein each said port and starboard modified transmission beams are mechanically stiffened only at localized segments adjacent each mounting hardpoint thereof.

11. The active noise control system of claim 10 wherein said actuator means comprises a first plurality of actuators mounted in combination with each mounting hardpoint of said port modified transmission beam and a second plurality of actuators mounted in combination with each mounting hardpoint of said starboard modified transmission beam, said first plurality of actuators being equal in number to said second plurality of actuators.

12. The active noise control system of claim 11 wherein said first plurality of actuators comprises six actuators and wherein said second plurality of actuators comprises six actuators.

13. The active noise control system of claim 2 wherein said actuator means comprises a plurality of actuators, each of said plurality of actuators being operative to generate a single dimensional counterforce having a predetermined frequency, magnitude, and phase, and wherein each of said single dimensional counterforce acts along a predetermined counterforce axis of said respective actuator.

14. The active noise control system of claim 13 wherein said sensor means further comprises:
a plurality of sensors mounted in combination with said modified transmission beam means adjacent each mounting hardpoint thereof, each of said sensors being mounted in a collinear, spaced apart functional correlation on said predetermined counterforce axis of said respective actuator, each said sensor being operative to detect the magnitude and frequency of a single dimensional component of said at least one high frequency vibration and operative to generate said detection signal representative thereof.

15. The active noise control system of claim 14 wherein said controller means further comprises:
a plurality of controllers functionally interconnecting each of said plurality of sensors with a corresponding one of said actuators, each said controller being operative in response to said detection signal from said respective sensor to provide said command signals to control operation of said respective actuator to generate a single dimensional counterforce having a frequency, magnitude, and phase to effectively nullify said at least one high frequency vibration at said transmission gearbox and airframe interface of said modified transmission beam means.

* * * * *